(12) United States Patent
Yang

(10) Patent No.: US 12,093,055 B2
(45) Date of Patent: Sep. 17, 2024

(54) METHOD AND APPARATUS FOR OBJECT FOLLOWING ROBOT USING UWB AND ODOMETRY-BASED RELATIVE POSITION ESTIMATION

(71) Applicant: ELECTRONICS AND TELECOMMUNICATIONS RESEARCH INSTITUTE, Daejeon (KR)

(72) Inventor: Jeong Gi Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 331 days.

(21) Appl. No.: 17/523,501

(22) Filed: Nov. 10, 2021

(65) Prior Publication Data

US 2023/0008482 A1 Jan. 12, 2023

(30) Foreign Application Priority Data

Jul. 6, 2021 (KR) ........................ 10-2021-0088738

(51) Int. Cl.
*G05D 1/00* (2024.01)

(52) U.S. Cl.
CPC ............. *G05D 1/028* (2013.01); *G05D 1/027* (2013.01); *G05D 1/0272* (2013.01)

(58) Field of Classification Search
CPC ...... G05D 1/028; G05D 1/027; G05D 1/0272; G05D 1/12; G05D 3/12; G01C 21/10; H04W 4/029; H04W 4/12; H04W 4/40
See application file for complete search history.

(56) References Cited

U.S. PATENT DOCUMENTS

2014/0244094 A1 8/2014 Kim et al.
2018/0370037 A1* 12/2018 Han ...................... B25J 9/1664
(Continued)

FOREIGN PATENT DOCUMENTS

CN  101630413 A  *  1/2010
CN  112788516 A  *  5/2021
(Continued)

OTHER PUBLICATIONS

English Translation of CN-101630413-A (Year: 2023).*
English Translation of CN-112788516-A (Year: 2024).*

*Primary Examiner* — Rami Khatib
*Assistant Examiner* — Shahira Baajour
(74) *Attorney, Agent, or Firm* — KILE PARK REED & HOUTTEMAN PLLC

(57) ABSTRACT

Disclosed are a method and apparatus for enabling a robot to follow an object by using distance measurement data and odometry data through ultra-wideband (UWB) to estimate a relative position of a target in a robot center coordinate system. The method comprises initializing a robot's own object following algorithm according to an object following request; transmitting a single-sided two-way ranging (SS-TWR) poll message; receiving a single response message in response to the SS-TWR poll message from the object, the single response message including second odometry information of a second odometry measurement device of the object; estimating a distance to the object based on a round trip delay calculated by an SS-TWR method; predicting a position of the object based on the second odometry information and first odometry information of the first odometry measurement device; and correcting the position of the object based on the estimated distance.

18 Claims, 5 Drawing Sheets

(56) References Cited

U.S. PATENT DOCUMENTS

| | | | |
|---|---|---|---|
| 2019/0339713 A1 | 11/2019 | Kwak et al. | |
| 2020/0033857 A1 * | 1/2020 | Yu et al. | |
| 2020/0298405 A1 * | 9/2020 | Park | B25J 9/162 |
| 2021/0107159 A1 * | 4/2021 | Goto | B25J 9/1664 |
| 2022/0022719 A1 | 1/2022 | Kwak et al. | |

FOREIGN PATENT DOCUMENTS

| | | | |
|---|---|---|---|
| EP | 3 831 544 | 6/2021 | |
| EP | 3831544 A1 * | 6/2021 | B25J 9/1664 |
| KR | 10-2014-0108821 | 9/2014 | |
| KR | 10-2020-0043319 | 4/2020 | |
| KR | 10-2021-0057364 | 5/2021 | |
| KR | 10-2554881 | 5/2021 | |

\* cited by examiner

METHOD AND APPARATUS FOR OBJECT FOLLOWING ROBOT USING UWB AND ODOMETRY-BASED RELATIVE POSITION ESTIMATION

CLAIM FOR PRIORITY

This application claims priority to Korean Patent Application No. 2021-0088738 filed on Jul. 6, 2021 in the Korean Intellectual Property Office (KIPO), the entire contents of which are hereby incorporated by reference.

BACKGROUND

1. Technical Field

Example embodiments of the present invention relate to an object following robot technology, and more particularly, to a method and apparatus for enabling a robot to follow an object by using distance measurement data and odometry (odometry) data through ultra-wideband (UWB) to estimate a relative position of a target in a robot center coordinate system and using a communication method and a driving method suitable therefor.

2. Related Art

Recently, since attempts have been made to mount an ultra-wideband (UWB)-based communication module in a smartphone, various technologies using the UWB are being studied. The UWB refers to a wireless communication protocol or a wireless communication technology capable of transmitting a large amount of information with low power over a very wide band compared to the existing spectrum.

Characteristics of the UWB are very precise spatial recognition and directionality, and the UWB is being actively used in research to make robots which follow users indoors by using an advantage of UWB that distance measurement accuracy is high during short-range wireless communication.

Most of the existing UWB-based user-following robots use a method in which users have a UWB tag and robots are equipped with four UWB anchors.

However, there is a disadvantage in that the existing UWB-based user-following method may not be used for micro-robots because four anchors have to maintain a distance that is a certain distance or more, and four antennas need to be installed very carefully due to characteristics of UWB being blocked by obstacles.

Therefore, there is a need for a method in which robots may effectively follow an object while overcoming the disadvantages of the existing UWB anchor and tag-based user-following robots.

SUMMARY

Example embodiments of the present invention provide a method and apparatus for an object following robot to enable the robot to effectively follow an object by estimating a relative position based on an independent ultra-wideband (UWB) module and odometry without dividing a UWB for an anchor and tag system.

Example embodiments of the present invention provide an object following robot algorithm for enabling the robot to effectively follow the object by attaching only one UWB module and odometry to the object and the robot, respectively, without attaching four UWB modules to the robot.

Example embodiments of the present invention provide a method and apparatus for an object following robot using a new driving method or a new communication method between the robot and the object, which are not only suitable for an ultra-small unmanned vehicle with no space for four UWB antennas to be installed, but are also useful for making the object following robot itself be an object again and be followed by another robot.

According to a first exemplary embodiment of the present disclosure, a method for an object following robot equipped with a first ultra-wideband (UWB) communication module and a first odometry measurement device, the method comprising: initializing a robot's own object following algorithm according to an object following request; transmitting a single-sided two-way ranging (SS-TWR) poll message; receiving a single response message in response to the SS-TWR poll message from the object, the single response message including second odometry information of a second odometry measurement device of the object; estimating a distance to the object based on a round trip delay calculated by an SS-TWR method; predicting a relative position of the object based on the second odometry information and first odometry information of the first odometry measurement device; and correcting the relative position of the object based on the estimated distance.

In the initializing, a relative position vector and covariance may be initialized based on a following request message received from the object according to a predefined protocol. The following request message may include an address of the second UWB communication module of the object, a relative position following algorithm period, and precision-related information of the second odometry measurement device.

The method may further include, prior to the estimating, initializing a relative position vector and covariance.

The method may further include, after the initializing, waiting until a norm of the covariance becomes less than or equal to a specific value, and starting following of the object when the norm of the covariance becomes less than or equal to the specific value.

The predicting may include predicting a relative position with the object based on distance information from the object measured by the robot, the first odometry information, and the second odometry information.

The predicting may include simultaneously predicting a relative position vector and covariance using an extended Kalman filter.

The predicting and the correcting may include correcting a relative position estimated through a relative position estimation algorithm to which an extended Kalman filter is applied.

$\overline{s(k)} = s(k) + u(k)$, $(u(k) = \text{odom}_{object} - \text{odom}_{robot})$ $P(k) = P(k) + Q$, $(Q = Q_{object} + Q_{robot})$ $H(k) = u(k)^T$ $K = \overline{P(k)} H(k)^T (H(k) \overline{P(k)} H(k)^T + R)$, $(R = R_{UWB})$ $s(k+1) = \overline{s(k)} + K(d(k)^2 - (k)\overline{s(k)})$ $P(k+1) = (I - KH(k))\overline{P(k)}$    [Relative position estimation algorithm]

In the relative position estimation algorithm, s( ) denotes a three-dimensional vector meaning a relative position vector from the robot to the object, P( ) denotes a covariance of the s( ), k denotes a user-tunable value, Q_object denotes precision of the second odometry measurement device of the object received at the time of the initialization, Q_robot denotes precision of the first odometry measurement device of the robot, a measurement model H is obtainable through a difference between the first and second odometry measurement devices, and R denotes distance measurement precision of the UWB.

The predicting and the correcting may be performed for following the object when the covariance of the position of the object decreases to a preset specified value or less through the relative position estimation algorithm.

The method may further comprise: receiving following distance-related information from the object through UWB data communication while following the object based on the corrected position; and adjusting a following distance for the object based on the estimated distance-related information.

The first or second odometry measurement device may include an inertial measurement unit (IMU) for estimating attitude and an accelerometer for estimating displacement. Also, the distance and the position may be calculated as coordinate values of a module coordinate system based on the first UWB communication module.

A displacement measurement value of the second UWB communication module of the object may be generated by coordinate transformation of a position change value of the second odometry measurement device.

According to a second exemplary embodiment of the present disclosure, an object following apparatus including a first ultra-wideband (UWB) communication module and a first odometry measurement device, the apparatus comprising: a processor; instructions executed by the processor; and a memory that stores the instructions, wherein, when the instructions are executed by the processor, the instructions cause the processor to: initialize a robot's own object following algorithm according to an object following request; transmit a single-sided two-way ranging (SS-TWR) poll message; receive a single response message in response to the SS-TWR poll message from the object, the single response message including second odometry information of a second odometry measurement device of the object; estimate a distance to the object based on a round trip delay calculated by an SS-TWR method; predict a relative position of the object based on the second odometry information and first odometry information of the first odometry measurement device; and correct the relative position of the object based on the estimated distance.

The processor may initialize a relative position vector and covariance based on a following request message received according to a predefined protocol from the object in the initializing.

The following request message may include an address of the second UWB communication module of the object, a relative position following algorithm period, and precision-related information of the second odometry measurement device.

Before the estimating, the processor may further perform initializing of a relative position vector and covariance.

After the initializing, the processor may further perform waiting until a norm of the covariance becomes less than or equal to a specific value, and starting following of the object when the norm of the covariance becomes less than or equal to the specific value.

The processor may estimate a relative position with the object based on distance information from the object measured by the robot, the first odometry information, and the second odometry information in the predicting.

The processor may simultaneously estimate a relative position vector and covariance using an extended Kalman filter in the predicting.

The processor may further perform receiving following distance-related information from the object through UWB data communication while following the object based on the corrected position; and adjusting a following distance for the object based on the estimated distance-related information.

DESCRIPTION OF EXAMPLE EMBODIMENTS

Figure 1:
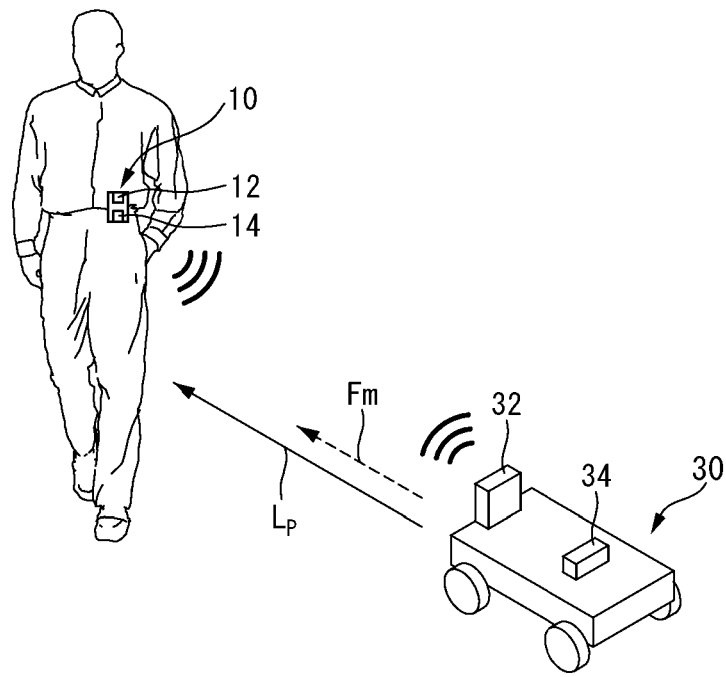
FIG. 1 is an exemplary diagram for describing an operation principle of an object following robot according to an embodiment of the present invention.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein. Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the specification, an ultra-wideband (UWB) is used in a wireless communication technology that transmits large-capacity information with low power over a very wide band compared to the existing spectrum. In a broad sense, the UWB is used in wireless communication that uses a bandwidth of 500 MHz or more and enables short-range high-speed communication regardless of presence or absence of a carrier or modulation, and wireless communication in which a bandwidth (specific bandwidth) corresponding to a center frequency is 20% or 25% or more.

In addition, the term "robot" may refer to a machine having a human-like appearance and function, to a mechanical device that may operate with a single computer program and automatically performs a complex series of actions, or to a mechanical device that automatically performs a certain operation or manipulation. In this specification, a robot includes any movable mechanical device that automatically adjusts movement thereof according to a movement of an object in order to follow the object. The robot may include a drone. In this case, a first drone may follow a front object or a second drone at a certain height and at a certain distance to the first drone.

Figure 2:
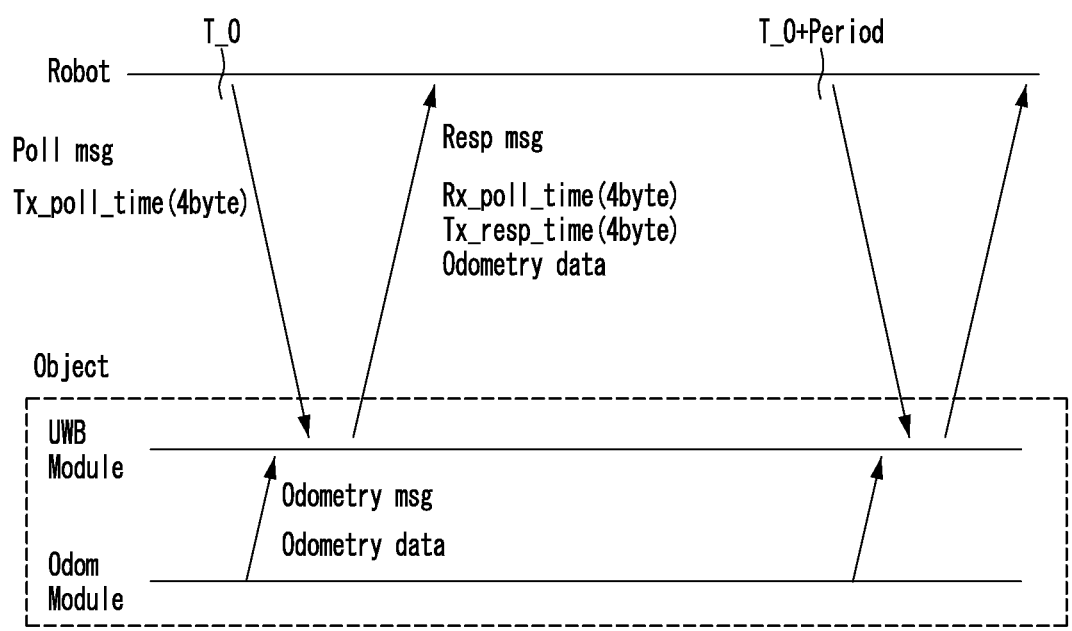
FIG. 2 is a diagram for describing a message transfer process between the object following robot of FIG. 1 and the object.
Figure 3:
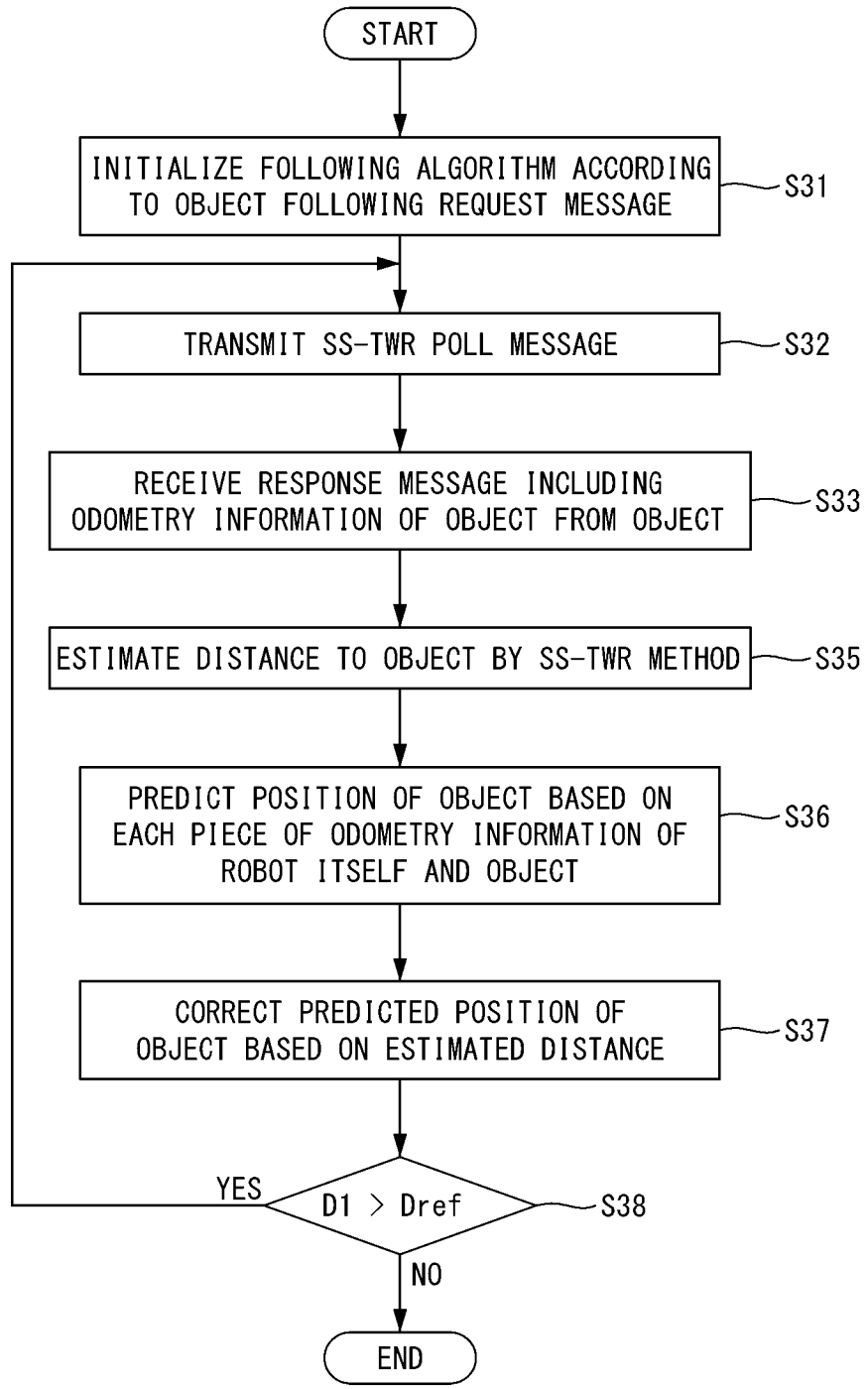
FIG. 3 is a flowchart of an object estimation method of the object following robot of FIG. 1.
Figure 4:
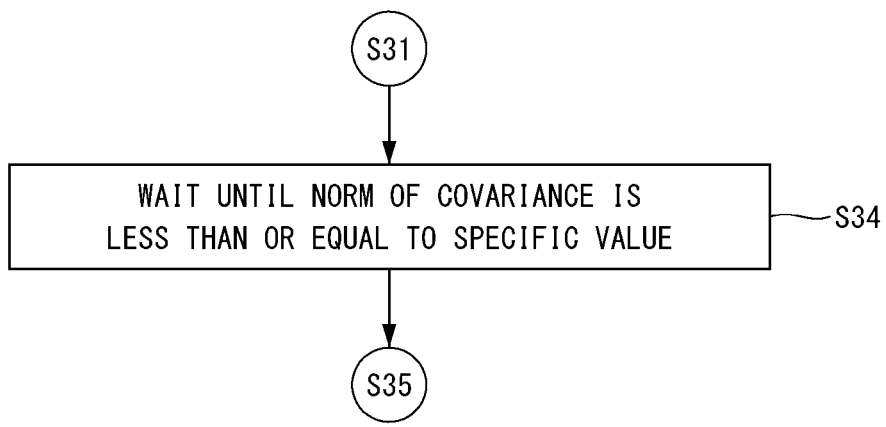
FIG. 4 is a flowchart of an additional procedure that may be employed in the object following method of FIG. 3.
Figure 5:
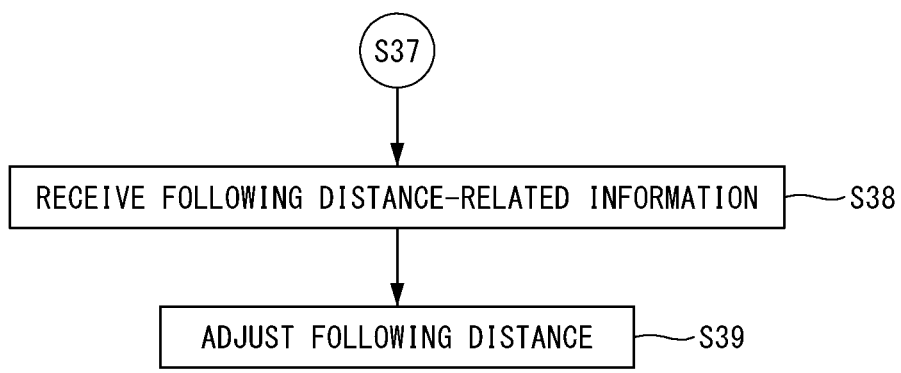
FIG. 5 is a flowchart of another additional procedure that may be employed in the object following method of FIG. 3.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted. FIG. 1 is an exemplary diagram for describing an operation principle of an object following robot according to an embodiment of the present invention. FIG. 2 is a diagram for describing a message transfer process between the object following robot of FIG. 1 and the object. FIG. 3 is a flowchart of an object estimation method of the object following robot of FIG. 1. FIG. 4 is a flowchart of an additional procedure that may be employed in the object following method of FIG. 3. FIG. 5 is a flowchart of another additional procedure that may be employed in the object following method of FIG. 3.

Referring to FIG. 1, an object following robot (hereinafter, simply referred to as a robot) 30 follows an object 10. To this end, the robot 30 includes a first UWB communication module 32 and a first odometer 34, and similarly, the object 10 is also a second ultra-wideband (UWB) communication module 12 and a second odometer 14.

The UWB communication module may be referred to as a UWB communication device or a UWB module. The odometer may be referred to as odometry or an odometry measurement device. The object 10 may be provided in the form of a person's smartphone or portable device.

It is assumed that the object 10 may measure an odometry thereof using the second odometer 14 and that data communication is possible through the second UWB communication module 12.

First, when the robot 30 receives a following request from an object, the robot 30 initializes an estimation algorithm thereof. Then, the robot 30 periodically transmits a poll message to the object 10 and receives a response message in response to the poll message from the object 10. The robot 30 acquires odometry information (hereinafter, second odometry information) of the object 10 through the response message. The poll message may include a single-sided two-way ranging (SS-TWR) poll message (see FIG. 2).

The robot 30 estimates a distance to the object 10 through the second odometry information. The robot 30 predicts a relative position through odometry information (hereinafter, first odometry information) and second odometry information thereof and then corrects the previously predicted relative position based on the previously estimated distance. The prediction and correction may follow an extended Kalman filter (EKF) method.

The robot 30 maintains a certain distance from the object based on the corrected relative position information and controls a direction and velocity thereof to follow and move the object. The robot 30 may control a master-slave distance or the like through UWB data communication while following the object 10.

An operation method or object following method of the above-described robot 30 will be described as follows. As illustrated in FIG. 3, the robot that includes the first UWB communication module and a first odometry measurement device and follows an object initializes a robot's own object following algorithm according to an object's following request (S31).

Next, the robot transmits a single-sided two-way ranging (SS-TWR) poll message (S32).

Next, the robot receives a response message in response to the SS-TWR poll message from the object (S33). The response message includes second odometry information of a second odometry measurement device of the object.

Next, the robot estimates the distance to the object based on a round trip delay (RTT) calculated by an SS-TWR method (S35).

Next, the robot predicts a position of the object through the second odometry information and the first odometry information of the first odometry measurement device (S36).

Next, the robot corrects the previously predicted position of the object based on the estimated distance (S37).

Next, the robot may return the step S32 and repeat the steps S32 to S37 when the last value D1 recorded in the robot based on the estimated distance or the predicted position of the object is greater than a predetermined reference value Dref (S38).

The UWB communication device and the odometry measurement device respectively mounted on the above-described object 10 and robot 30 will be described in more detail.

The UWB communication device is a communication device using a general UWB method, and it is assumed that the UWB communication device can perform general data communication with other UWB communication devices and measure distances therebetween. However, unlike a general UWB real-time location system (RTLS), the UWB communication device can implement a corresponding function operation between single modules without dividing the UWB for an anchor and a tag. That is, the UWB communication device is configured so that the tags may operate with each other. Also, it is necessary to know each other's addresses for communication, but it is assumed that an object knows a UWB communication address of a robot. The object may acquire and store information about a robot through a web service of a robot manufacturer that can be accessed through a network.

The odometry measurement device is a device that may estimate a movement path of each device of an object or a robot. The odometry measurement device is not necessary to measure absolute position coordinates, and it is sufficient to be able to compare current position information with information at a certain time ago. Such an odometry measurement device may include any device that satisfies conditions of the odometry measurement device, such as estimating attitude through an inertial measurement unit (IMU) indoors and estimating a change in position through accelerometer integration.

The coordinate values used in the present embodiment are all processed as occurring in a central coordinate system of the UWB communication device. A position change measurement of the UWB measurement device may be obtained by transforming a position change value of the odometry measurement device into coordinates.

For the implementation of the object following robot algorithm of the present embodiment, the UWB communication device and the odometry measurement device are respectively mounted on both the object and the robot. However, the UWB communication device and the odometry measurement device mounted on the object and the robot do not necessarily have to be the same device. The object is not limited to a portable terminal or a portable electronic device carried by a user and may include other robots that move by themselves.

Next, the following initialization and a transmission/reception message will be described in more detail.

The robot measures a distance using the SS-TWR method through an object's response (resp) message. The robot can estimate a relative position with an object using the EKF method. When using the EKF method or the like, the robot needs to initialize a relative position vector and covariance before estimating the relative position.

The following initialization may be made by an operation of a robot to receive a following request from an object and initialize the relative position vector and the covariance. The robot may receive the following request message from the object according to a predetermined protocol. The following request message may include an object UWB communication address, a relative position following algorithm period, and precision-related information of odometry.

After receiving the following request, the robot may transmit the SS-TWR poll message to the UWB communication address of the object included in the following request message. The robot may receive an SS-TWR resp message from the object that has received the message. The robot measures the distance to the object through the SS-TWR resp message. After measuring the distance, the robot may initialize the relative position vector and covariance thereof by the method of [Equation 1] below.

$$s(0)=[0,0,0]^T,$$

$$P(0)=kd_0I$$

$(k=\text{(initialization gain)}, d_0=\text{(distance to object)})$ [Equation 1]

In [Equation 1], s( ) denotes a three-dimensional vector meaning a relative position vector from a robot to an object, P( ) denotes a covariance of the s( ), k denotes a user-tunable value for initialization gain, d0 denotes the distance from the object, and I denotes the 3D identity matrix.

After initialization, the robot may wait until a norm of the covariance becomes less than or equal to a specific value specified by a user (refer to S34 of FIG. 4). When the norm of the covariance is below a specific value, the object following or the main process may start, including the estimation, prediction, and correction for the object following. For reference, just before the start of the process, for the effective estimation, the object may move slightly. In this case, the norm value may be decreased appropriately. The operation of these objects may be performed according to the self-configuration of the object that transmits the following request or according to the request of the object estimating robot.

Next, the relative position estimation algorithm will be described in more detail.

The relative position estimation algorithm is an algorithm for estimating the relative position with the object through distance information d(k) from the object measured by the robot, odometry information (odom_object) received from an object, and a robot's own odometry information (odom_robot). Since this algorithm is based on the extended Kalman filter, it uses a method of simultaneously estimating a relative position vector and a covariance. The prediction and correction of the extended Kalman filter are as in [Equation 2].

$$\overline{s(k)}=s(k)+u(k), \ (u(k)=\text{odom}_{object}-\text{odom}_{robot})$$

$$\overline{P(k)}=P(k)+Q, \ (Q=Q_{object}+Q_{robot})$$

$$H(k)=u(k)^T$$

$$K=\overline{P(k)}H(k)^T(H(k)\overline{P(k)}H(k)^T+R), \ (R=R_{UWB})$$

$$s(k+1)=\overline{s(k)}+K(d(k)^2-H(k)\overline{s(k)})$$

$$P(k+1)=(I-KH(k))\overline{P(k)}$$ [Equation 2]

In [Equation 2], s(k) is a three-dimensional vector meaning the relative position vector from the robot to the object at a specific time k, which is a user-tunable value, P(k) is the covariance of s(k), $Q_{object}$ denotes the precision of the second odometry measurement device of the object received during the initialization, $Q_{robot}$ denotes the precision of the first odometry measurement device of the robot, and a measurement model H(k) can be acquired through the difference between the first and second odometry measurement devices, and R denotes the distance measurement precision of the UWB.

Each degree of precision is information that can be obtained by analyzing sensor noise but can be tuned and used for user convenience. The measurement model H(k) can be obtained through the difference between the odometry. R denotes the distance measurement precision of the UWB (RUWB). Based on such data, the extended Kalman filter may be applied, and thus, the relative position of the object may be estimated.

The relative position estimation algorithm that may be employed for the object estimation method of the present embodiment may use a unique UWB message transfer protocol.

In other words, since the general UWB module uses a distance measurement function and a data transfer function separately, there is a need to exchange a message at least three times: transmitting the SS-TWR poll message from the robot to the object, transmitting the SS-TWR resp message from the object to the robot, and transmitting odometry data from the object to the robot. In the case of asynchronous operation, a general UWB communication module of an object requests data from the odometry measurement device and requires time to acquire the odometry data.

On the other hand, referring back to FIG. 2, the UWB module of the present embodiment or the object following robot equipped with the UWB module uses a message structure in which synchronous SS-TWR and data communication are combined or a communication method using such a message structure.

That is, in the present embodiment, the robot transmits the SS-TWR poll message (poll msg) to the object at a first time (T_0) and receives the SS-TWR resp message (resp msg) from the object. The poll message may include message transmission time (Tx_poll_time) information. In this case, unlike the conventional general method, the UWB communication module (UWB module) of the object of the present embodiment acquires and stores odometry-related data (odometry data) from the second odometry measurement device (odom module) according to a predetermined period. The object transmits object's own odometry-related data, such as the odometry message (odometry msg), by further including the object's own odometry-related data in the SS-TWR resp message. The SS-TWR resp message may include a protocol header, 1-byte data for SS-TWR, or the like, or 3 symbols (8 bytes*3 symbol) by 8 bytes. For example, the SS-TWR resp message may include a poll message reception time (Rx_poll_time), a response message transmission time (Tx_resp_time), and the odometry data.

In accordance with the period set in the following initialization operation, the robot and object exchange the SS-TWR poll message and the SS-TWR resp message two times, and thus, the robot may acquire all information for relative position estimation.

Next, the robot's object following algorithm will be described in more detail.

After the following initialization, when the covariance of the relative position decreases to a specific value or less specified by the user or the like through the relative position following algorithm, the robot may be controlled through the object following algorithm to follow the object.

It is assumed that the robot can estimate a direction (yaw) and velocity thereof and may control a direction (yaw rate) and a straight forward (velocity_front) velocity thereof. In this case, the vertical movement of the robot is not considered. It is assumed that this movement is a suitable for drones as well as ground-mobile robots.

The control target of the object following method according to the present embodiment is to ensure that a front of a drone always faces an object and that a distance to the object is constant. In order to reach the control target, a control algorithm such as [Equation 3] may be used.

$$\text{yaw rate} = K_{yaw}(\text{yaw}_{error})$$

$$\text{velocity}_{front} = K_{vel} \cos(\text{yaw}_{error})(d_{error}),$$
$$(d_{error} = d_{desired} - \sqrt{s_x^2 + s_y^2}) \quad \text{[Equation 3]}$$

In [Equation 3], $K_{yaw}$ is a coefficient for attitude control, and $K_{vel}$ is a coefficient for velocity control. Coefficients are generally given, and a user may tune the coefficients for desired performance. $D_{desired}$ enables a user to change the distance between the desired object and the robot to general data communication through the UWB while the object following algorithm is driving.

That is, as illustrated in FIG. 5, the robot may receive the following distance-related information from the object (S38) and adjust the following distance based on the following distance-related information (S39).

As such, the object estimation technology of the robot according to the present embodiment may provide an algorithm for estimating the relative position of the object in the robot center coordinate system by fusing the distance measurement data and the odometry data through the UWB, a communication method suitable for such an algorithm, and a driving method of making the robot follow the object after estimating the relative position.

Figure 6:
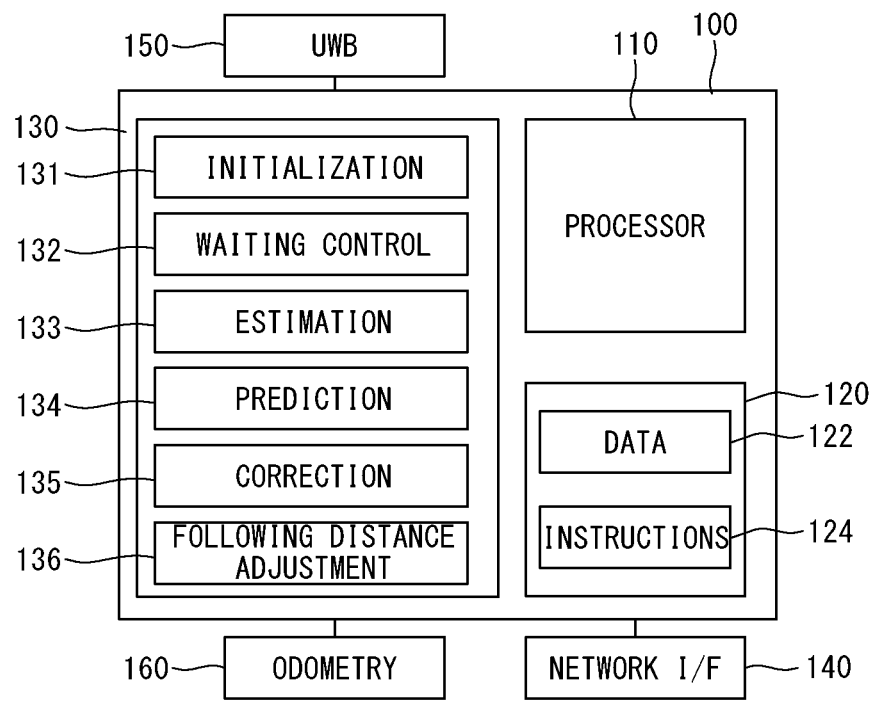
FIG. 6 is a block diagram of a main configuration of an object following robot according to another embodiment of the present invention.
Figure 7:
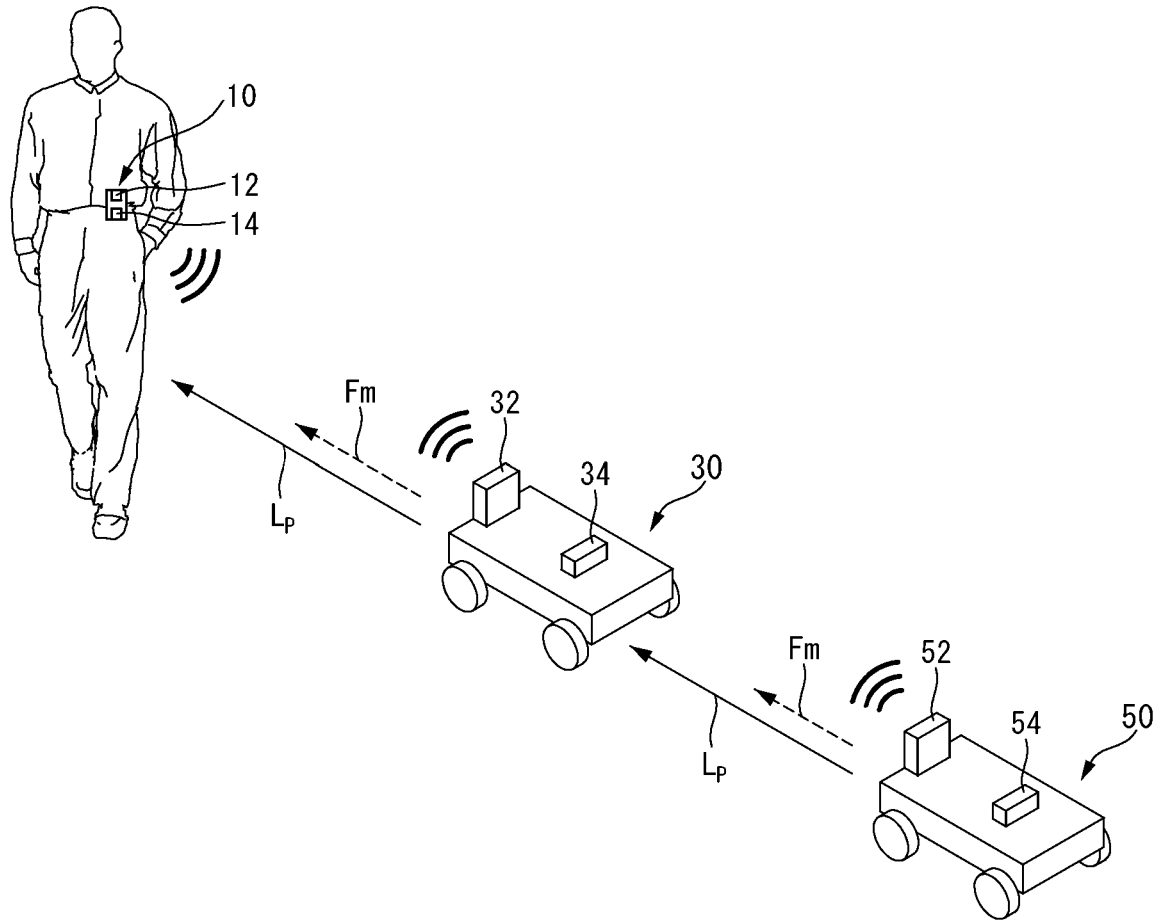
FIG. 7 is an exemplary diagram illustrating a form in which the object following robot of FIG. 6 is followed by another robot while following an object.
Figure 8:
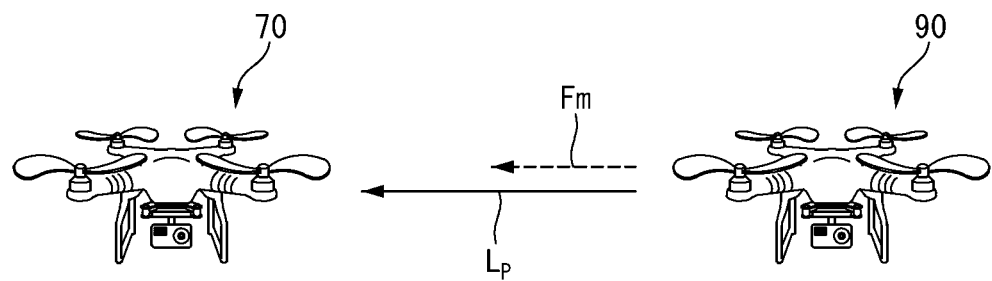
FIG. 8 is an exemplary diagram of a form in which a drone, which is the object following robot of FIG. 6, follows another drone which is an object.

FIG. 6 is a block diagram of a main configuration of an object following robot according to another embodiment of the present invention. FIG. 7 is an exemplary diagram illustrating a form in which the object following robot of FIG. 6 is followed by another robot while following an object. FIG. 8 is an exemplary diagram of a form in which a drone, which is the object following robot of FIG. 6, follows another drone which is an object.

Referring to FIG. 6, an object following robot 100 may include at least one processor 110 and a memory 120. In addition, the object following robot 100 may be connected to a network interface (I/F) that is connected to a network to perform communication. A network interface 140 may be included in the object following robot 100. In addition, the object following robot 100 may be connected to a UWB communication module 150 and an odometry measurement device 160. The UWB communication module 150 and the odometry measurement device 160 may be included in the robot 100.

The processor 110 may execute a program or instructions stored in the memory 120 or a storage device corresponding thereto. The processor 110 may be a central processing unit (CPU), a graphics processing unit (GPU), or a dedicated processor through which methods according to embodiments of the present invention are performed. The memory 120 or the storage device may be configured as at least one of a volatile storage medium and a non-volatile storage medium. For example, the memory 120 may be configured as at least one of a read only memory (ROM) and a random access memory (RAM).

In addition, the object following robot 100 may include an object following robot algorithm 130. The object following robot algorithm 130 may include an initialization module 131, a standby control module 132, an estimation module 133, a prediction module 134, a correction module 135, and a following distance adjustment module 136. The object following robot algorithm 130 may be stored in the memory 120 as data 122 or a part of a program or a part of the instructions 124 and may be mounted on the processor 110 and executed.

A message transmitting/receiving module may transmit the SS-TWR poll message to the object through the network interface 140 and receive a response message in response to the SS-TWR poll message from the object. The response message includes second odometry information of the second odometry measurement device of the object.

The initialization module 131 initializes the relative position vector and covariance to be used in the robot's own object following algorithm according to the following request of the object.

After the initialization, the standby control module 132 may delay an operation start time of the following process until the norm of the covariance becomes less than or equal to the specific value specified by the user.

The estimation module 133 may estimate the relative position with the object based on the central coordinate system of the UWB module of the robot based on the response message of the object. That is, the estimation module 133 may estimate the distance to the object based on the round trip delay (RTT) calculated by the SS-TWR method.

The prediction module 134 may predict the position of the object through the second odometry information and the first odometry information of the first odometry measurement device.

The correction module 135 may correct the previously predicted position of the object based on the estimated distance.

The following distance adjustment module 136 may adjust the following distance according to the following distance-related information received from the object.

According to the present embodiment, as illustrated in FIG. 7, the first robot 30 follows the object 10, and the second robot 50 equipped with the third UWB communication module 52 and the third odometry measurement device 54 may follow the first robot. In this case, the first robot 30 may acquire the position information for the object following through one round-trip message transmission/reception to and from the object 10, and the second robot 50 may acquire the position information for the following of the first robot 30 through the one round-trip message transmission/reception to and from the first robot 30.

Also, as illustrated in FIG. 8, the present embodiment may be applied to drones 70 and 90, and it is assumed that each drone may estimate a direction thereof, for example, a yaw direction and velocity thereof, and a yaw rate and straight forward (velocity_front) velocity thereof. In this case, the vertical movement of the drone is not considered. The second drone 90 may share distance measurement and odometry with the first drone 70 and estimate a relative position Lp of the first drone 70 and, thus, follow (Fm) the first drone 70 through the object following algorithm. The object following method according to the present embodiment may be used to control the front of the second drone 90 to face the first drone 70 and to control the distance to the first drone 70 to be constant.

According to the present invention, it is possible to provide a new algorithm for enabling a robot to effectively follow an object based on a relative position estimated through ultra-wideband (UWB) and odometry. That is, the role of the UWB system used in the existing object following robot technology is divided and used for an anchor and a tag. However, in the present embodiment, the role of the UWB system is not divided, and odometry is used together, and thus, each UWB communication module mounted on a robot and an object, respectively, is implemented to be a subject to follow and a subject to be followed, and thus the system may be implemented simply and efficiently so that a first robot effectively follows a user and another second robot follows the first robot.

In addition, according to the present invention, it is possible to provide an initialization method with less system load than the existing UWB system, a new object following protocol capable of acquiring data required for an object following algorithm with a small number of communications, and an object following method and apparatus using the protocol.

In addition, an object following robot algorithm according to the present invention can control the corresponding robot using a control input commonly used in almost all robots including unmanned moving objects, drones, etc., and thus has an advantage that can be effectively applied to various robots.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for following an object by a robot equipped with a first ultra-wideband (UWB) communication module and a first odometry measurement device, the method comprising:

initializing a following algorithm of the robot according to a following request message from the object, wherein, in the initializing, a relative position vector from the robot to the object and a covariance of the relative position vector are initialized based on the following request message, and wherein the following request message includes an object UWB communication address signal of a second UWB communication module of the object, the object being a target followed by the robot;

transmitting a single-sided two-way ranging (SS-TWR) poll message;

receiving a single response message in response to the SS-TWR poll message from an object, the single response message including second odometry information of a second odometry measurement device of the object;

estimating a distance to the object based on a round trip delay according to the SS-TWR poll message and the single response message;

predicting a position of the object based on the second odometry information and first odometry information of the first odometry measurement device;

correcting the predicted position of the object based on the estimated distance when the predicted position of the object is greater than a predetermined reference value; and after the initializing, waiting until a norm of the covariance becomes less than or equal to a specific value.

2. The method of claim 1, wherein the following request message further includes precision-related information of the second odometry measurement device.

3. The method of claim 1, wherein the relative position vector is a three-dimensional vector.

4. The method of claim 3, further comprising, after the initializing, starting following of the object when the norm of the covariance becomes less than or equal to the specific value.

5. The method of claim 1, wherein the predicting further comprises predicting the position of the object based on distance information with the object measured by the robot, the first odometry information, and the second odometry information.

6. The method of claim 5, wherein the predicting comprises simultaneously predicting the relative position vector and the covariance using an extended Kalman filter.

7. The method of claim 1, wherein the predicting and the correcting further comprise correcting the predicated relative position through the following algorithm including a relative position estimation algorithm to which an extended Kalman filter is applied, $\overline{S(k)}=s(k)+u(k)$, $(u(k)=\text{odom}_{object}-\text{odom}_{robot})$ $P(k)=P(k)+Q$, $(Q=Q_{object}+Q_{robot})$ $H(k)=u(k)^T$ $K=\overline{P(k)}H(k)^T(H(k)\overline{P(k)}H(k)^T+R)$, $(R=R_{UWB})$ $s(k+1)=\overline{s(k)}+K(d(k)^2-(k)\overline{s(k)})$ $P(k+1)=(I-KH(k))\overline{P(k)}$ [Relative position estimation algorithm]

in the relative position estimation algorithm, s( ) denotes a three-dimensional vector meaning the relative position vector from the robot to the object, P( ) denotes the covariance of the s( ), k denotes a user-tunable value, $Q_{object}$ denotes precision of the second odometry measurement device of the object received at a time of the initialization, $Q_{robot}$ denotes precision of the first odometry measurement device of the robot, a measurement model H is calculated when there is a difference between the first and second odometry measurement devices, and R denotes distance measurement precision of the UWB.

8. The method of claim 7, wherein the predicting and the correcting are performed for following the object when a covariance of the position of the object decreases to a preset specified value or less through the relative position estimation algorithm.

9. The method of claim 1, further comprising:
receiving following distance information from the object through UWB data communication while following the object based on the corrected position; and
adjusting a following distance from the robot to the object based on the following distance information.

10. The method of claim 1, wherein the first or second odometry measurement device includes an inertial measurement unit (IMU) for estimating attitude and an accelerometer for estimating displacement, and the distance and the position are calculated as coordinate values in a central coordinate system of the first UWB communication module based on the single response message of the object.

11. The method of claim 10, wherein a displacement measurement value of the second UWB communication module of the object is generated by coordinate transformation of a position change value of the second odometry measurement device.

12. An apparatus including a first ultra-wideband (UWB) communication module and a first odometry measurement device and following an object, the apparatus comprising:
a processor;
instructions executed by the processor; and
a memory that stores the instructions,
wherein, when the instructions are executed by the processor, the instructions cause the processor to:
initialize following algorithm of the apparatus according to a following request message from the object, wherein a relative position vector and a covariance are initialized based on the following request message, and wherein the following request message includes an object UWB communication address signal of a second UWB communication module of the object, the object being a target followed by the apparatus;
transmit a single-sided two-way ranging (SS-TWR) poll message;
receive a single response message in response to the SS-TWR poll message from the object, the single response message including second odometry information of a second odometry measurement device of the object;
estimate a distance to the object based on a round trip delay according to the SS-TWR poll message and the single response message;
predict a position of the object based on the second odometry information and first odometry information of the first odometry measurement device; and
correct the predicted position of the object based on the estimated distance when the predicted position of the object is greater than a predetermined reference value,
wherein, after the initializing, the processor further performs waiting until a norm of the covariance becomes less than or equal to a specific value.

13. The object following apparatus of claim 12, wherein the following request message further includes precision-related information of the second odometry measurement device.

14. The object following apparatus of claim 12, wherein prior to the estimating, the processor further performs initializing of a three-dimensional vector and a covariance of the three-dimensional vector, the three-dimensional vector being a relative position vector from the robot to the object.

15. The object following apparatus of claim 14, wherein, after the initializing, starting following of the object when the norm of the covariance becomes less than or equal to the specific value.

16. The object following apparatus of claim 12, wherein the processor estimates the position of the object based on distance information with the object measured by the robot, the first odometry information, and the second odometry information in the predicting.

17. The object following apparatus of claim 16, wherein the processor simultaneously estimates the relative position vector and the covariance using an extended Kalman filter in the predicting.

18. The object following apparatus of claim 12, wherein the processor further performs receiving following distance information from the object through UWB data communication while following the object based on the corrected position; and adjusting a following distance from the robot to the object based on the following distance information.

* * * * *